United States Patent
Jamkhedkar et al.

(10) Patent No.: US 12,056,249 B2
(45) Date of Patent: *Aug. 6, 2024

(54) UNIFIED IDENTITY SERVICES FOR MULTI-TENANT ARCHITECTURES

(71) Applicant: PayPal, Inc., San Jose, CA (US)

(72) Inventors: Prashant Jamkhedkar, Fremont, CA (US); Aravindan Ranganathan, San Jose, CA (US); Sandeep Kumar, Fremont, CA (US); Norihiro Aoki, San Jose, CA (US); Justin White, La Selva, CA (US); Jeffrey Meyer, Los Gatos, CA (US)

(73) Assignee: PayPal, Inc., San Jose, CA (US)

( * ) Notice: Subject to any disclaimer, the term of this patent is extended or adjusted under 35 U.S.C. 154(b) by 407 days.

This patent is subject to a terminal disclaimer.

(21) Appl. No.: 17/340,473

(22) Filed: Jun. 7, 2021

(65) Prior Publication Data
US 2021/0319123 A1 Oct. 14, 2021

Related U.S. Application Data

(63) Continuation of application No. 16/009,994, filed on Jun. 15, 2018, now Pat. No. 11,030,329.

(51) Int. Cl.
*G06F 9/00* (2018.01)
*G06F 16/28* (2019.01)
(Continued)

(52) U.S. Cl.
CPC .......... *G06F 21/604* (2013.01); *G06F 16/288* (2019.01); *G06F 16/9024* (2019.01);
(Continued)

(58) Field of Classification Search
CPC .. G06F 21/604; G06F 16/288; G06F 16/9024; G06F 21/62; H04L 67/51; H04L 67/60; H04L 63/102
(Continued)

(56) References Cited

U.S. PATENT DOCUMENTS 7,657,639 B2 2/2010 Hinton
8,271,536 B2 9/2012 Amradkar et al.
(Continued)

FOREIGN PATENT DOCUMENTS

CN 105830388 A 8/2016
CN 105917309 A 8/2016
(Continued)

OTHER PUBLICATIONS

Ashwini A., "What Are The Pros And Cons Of Muititenancy In Rails Application?", [online], Retrieved from the Internet: https://medium.com/swlh/what-are-the-pros-and-cons-of-multi-tenancy-in-railsapplication, Apr. 30, 2018, 9 pages.
(Continued)

*Primary Examiner* — Jae U Jeon
(74) *Attorney, Agent, or Firm* — Haynes and Boone, LLP

(57) ABSTRACT

A method for using unified identities in a multi-tenant architecture system is discussed. The method includes receiving a request, at a first service provider, to provide a service for a user. The method includes accessing a representation of a second service provider in a first hierarchical data structure managed by the first service provider. The method includes determining that user data required for the service is managed by the second service provider that manages user identity of the user. The method includes determining that the representation is linked with a full identity reference for the second service provider in a second hierarchical data structure managed by the second service provider. The method includes accessing the user data at the second hierarchical data structure using the full identity reference. The method includes accessing the service via the lightweight identity reference and using the user data at the first service provider.

20 Claims, 7 Drawing Sheets

(51) Int. Cl.
*G06F 16/901* (2019.01)
*G06F 21/60* (2013.01)
*G06F 21/62* (2013.01)
*H04L 9/40* (2022.01)
*H04L 67/51* (2022.01)
*H04L 67/60* (2022.01)

(52) U.S. Cl.
CPC ............ *G06F 21/62* (2013.01); *H04L 63/102* (2013.01); *H04L 67/51* (2022.05); *H04L 67/60* (2022.05); *G06F 2221/2141* (2013.01)

(58) Field of Classification Search
USPC ......................................................... 717/120
See application file for complete search history.

(56) References Cited

U.S. PATENT DOCUMENTS

| | | | |
|---|---|---|---|
| 8,819,801 | B2 | 8/2014 | Sangubhatla et al. |
| 8,918,091 | B1* | 12/2014 | Hoelzle ................. H04W 4/046 |
| | | | 455/418 |
| 8,918,641 | B2 | 12/2014 | Smith et al. |
| 9,058,481 | B2 | 6/2015 | Prasad et al. |
| 9,218,599 | B1 | 12/2015 | Hilbring |
| 9,710,664 | B2 | 7/2017 | Sathyadevan et al. |
| 9,781,122 | B1 | 10/2017 | Wilson et al. |
| 9,992,186 | B1 | 6/2018 | Drozd et al. |
| 10,581,867 | B2 | 3/2020 | Srinivasan et al. |
| 10,853,763 | B1 | 12/2020 | Armstrong et al. |
| 10,931,656 | B2 | 2/2021 | Carru et al. |
| 11,734,658 | B2 | 8/2023 | Jamkhedkar et al. |
| 2002/0010591 | A1 | 1/2002 | Pomerance |
| 2004/0117298 | A1 | 6/2004 | Algiene et al. |
| 2005/0261968 | A1 | 11/2005 | Randall et al. |
| 2006/0059565 | A1 | 3/2006 | Green et al. |
| 2007/0150480 | A1 | 6/2007 | Hwang et al. |
| 2007/0294405 | A1* | 12/2007 | Mohindra ................ H04L 67/51 |
| | | | 709/226 |
| 2008/0154783 | A1 | 6/2008 | Rule et al. |
| 2008/0288400 | A1 | 11/2008 | Panthaki et al. |
| 2009/0125972 | A1 | 5/2009 | Hinton et al. |
| 2011/0276674 | A1 | 11/2011 | Jensen-Horne et al. |
| 2011/0276892 | A1 | 11/2011 | Jensen-Horne et al. |
| 2012/0072307 | A1 | 3/2012 | Kassaei et al. |
| 2012/0197963 | A1 | 8/2012 | Bouw et al. |
| 2012/0218917 | A1* | 8/2012 | Komarevtsen ...... H04L 41/0843 |
| | | | 370/254 |
| 2012/0258777 | A1 | 10/2012 | Huang |
| 2013/0046600 | A1 | 2/2013 | Coppinger |
| 2013/0132404 | A1* | 5/2013 | Liu .......................... G06F 16/27 |
| | | | 707/748 |
| 2013/0318241 | A1 | 11/2013 | Acharya et al. |
| 2014/0230076 | A1 | 8/2014 | Micucci et al. |
| 2015/0161620 | A1 | 6/2015 | Christner |
| 2015/0193775 | A1 | 7/2015 | Douglas et al. |
| 2015/0193858 | A1 | 7/2015 | Reed et al. |
| 2015/0348003 | A1 | 12/2015 | Reader |
| 2016/0087960 | A1 | 3/2016 | Pleau et al. |
| 2016/0092859 | A1 | 3/2016 | Klingen |
| 2016/0142409 | A1 | 5/2016 | Frei et al. |
| 2016/0292694 | A1 | 10/2016 | Goldschlag et al. |
| 2016/0335118 | A1 | 11/2016 | Beiter et al. |
| 2016/0337365 | A1 | 11/2016 | Beiter |
| 2017/0012962 | A1 | 1/2017 | Lissack et al. |
| 2017/0048306 | A1 | 2/2017 | Amador |
| 2017/0318128 | A1 | 11/2017 | Ananthanarayanan et al. |
| 2017/0323117 | A1 | 11/2017 | Pleau et al. |
| 2018/0013763 | A1 | 1/2018 | Wilson et al. |
| 2018/0075231 | A1 | 3/2018 | Subramanian et al. |
| 2018/0081905 | A1 | 3/2018 | Kamath et al. |
| 2018/0309759 | A1 | 10/2018 | Leibmann et al. |
| 2019/0014120 | A1 | 1/2019 | Drabant |
| 2019/0026486 | A1 | 1/2019 | Pleau et al. |
| 2020/0007529 | A1 | 1/2020 | Bahrenburg et al. |
| 2020/0412538 | A1 | 12/2020 | Rosado |
| 2021/0136083 | A1* | 5/2021 | Gordon ................. H04W 12/08 |

FOREIGN PATENT DOCUMENTS

| | | |
|---|---|---|
| CN | 107852417 A | 3/2018 |
| CN | 108322472 A | 7/2018 |
| CN | 108337260 A | 7/2018 |
| EP | 3361700 B1 | 8/2021 |

OTHER PUBLICATIONS

Crown N., "An Introduction to SCIM: System for Cross-Domain System for Cross-Domain Identity Management", RSA Conference Europe 2012 [online], Retrieved on Apr. 24, 2018, Retrieved from the Internet: URL: https://www.rsaconference.com/writable/presentations/file.../iam-107a_crown.pdf, 24 pages.
European Application No. 19819808.7, Extended European Search Report mailed on Jun. 8, 2021, 7 pages.
"Single tenant vs Multi tenant business softwarecommunifire" axero Online, Retrieved on Apr. 30, 2018, Retrieved from the internet: URL: http://axerosolutions.com/blogs/timeisenhauer/pulse/146/single-tenent-vs-multi-tenant-business-software, 9 Pages.
International Appl. No. PCT/US2019/037242, International Preliminary Report on Patentability mailed on Dec. 24, 2020, 12 pages.
International Appl. No. PCT/US2019/037242, International Search Report and Written Opinion mailed on Oct. 4, 2019, 12 pages.
International Appl. No. PCT/US2019/064325, International Search Report and Written Opinion mailed Mar. 24, 2020, 16 pages.
International Application No. PCT/US2019/064325, International Preliminary Report on Patentability mailed on Jun. 17, 2021, 6 pages.
International Application No. PCT/US2019/068993, International Preliminary Report on Patentability mailed on Jul. 8, 2021, 8 pages.
International Application No. PCT/US2019/068999, International Preliminary Report on Patentability mailed on Jul. 8, 2021, 7 pages.
International Application No. PCT/US2019/068999, International Search Report and Written Opinion mailed on Mar. 31, 2020, 8 pages.
International Search Report and Written Opinion from PCT/US19/68993, mailed Mar. 31, 2020, 14 pages.
International Search Report and Written Opinion from PCT/US19/68999, mailed Mar. 31, 2020, 14 pages.
Johnes M., et al., "JSON Web Token (JWT)," May 2015, 30 pages.
Kabbedijk J., et al., "Multi-Tenant Architecture Comparison", [Online], Retrieved on Apr. 30, 2018. Retrieved from the Internet: URL: https://pdfs.semanticschoiar.org/17fb/e778244aa190da9d56c5fb8c2e64c63cd621.pdf, 8 pages.
Li K., et al., "System for Cross-domain Identity Management: Definitions, Overview, Concepts and Requirements" [online], retrieved on Apr. 24, 2019, Retrieved from the internet: URL: https://tools.ietf.org/html/ric7642, 19 pages.
Microsoft Application Architecture Guide, Chapter 2: Key Principles of Software Architecture, 2nd Edition—Retrieved from the internet: URL: https://docs.microsoft.com/en-us/previous-versions/msp-np/ee658124%28v%3dpandp10%29, Oct. 2009, [Online], Retrieved on Apr. 30, 2018, 6 pages.
"Multi-tenancy is fundamental to SaaS applications—and it's better for you, too" Sage Intacct Online, Retrieved on Apr. 30, 2018. Retrieved from the Internet: URL: https://www.sageintacct.com/cloud-erp/multi-tenant-cloudarchitecture, 4 Pages.
"Multi-tenant Vs. Single-tenant Architecture (SaaS)" Online, retrieved on Apr. 30, 2018, Retrieved from the Internet: URL: https://blogs.sap.com/2015/07/12/multi-tenant-vs-single-tenant-architecture-saas/, 5 pages.
Nidhiben S., et al., "Multi-Tenant Access and Information Flow Control for SaaS", IEEE International Conference on Web Services, Jun. 27, 2016, Retrieved from the Internet: URL: https://ieeexplore.ieee.org/document/7557990, Retrieved on Mar. 4, 2021, 8 pages.
Extended European Search Report mailed Jan. 21, 2022 from European Application No. EP19903189, 10 pages.

(56) References Cited

OTHER PUBLICATIONS

Anonymous: "Multitenancy—Wikipedia". Retrieved from the Internet: URL:https://en.Wikipedia.org/w/index.php?title=Multitenancy&oldid=598245774 [retrieved on Oct. 18, 2019]. pp. 1-5.
First Office Action mailed Dec. 28, 2023 in Chinese application No. 201980087063.6, 5 pages.
First Office Action mailed Jan. 30, 2024 in Chinese application No. 201980052687.4, 13 pages.
Mohamed F., et al., "An Integrated Platform for Dynamic Adaptation of Multi-Tenant Single Instance SaaS Applications," 2017 IEEE 5th International Conference on Future Internet of Things and Cloud, 2017, pp. 257-264.
Zheng J., "A Framework for Migration of Conventional Client-Server Software Systems to Cloud," May 2014, The University of New Brunswick, 114 pages.

\* cited by examiner

US 12,056,249 B2

UNIFIED IDENTITY SERVICES FOR MULTI-TENANT ARCHITECTURES

CROSS-REFERENCE TO RELATED APPLICATION

This application is a continuation of U.S. patent application Ser. No. 16/009,994, filed on Jun. 15, 2018 and entitled "UNIFIED IDENTITY SERVICES FOR MULTI-TENANT ARCHITECTURES," the disclosure of which is expressly incorporated herein by reference in its entirety.

BACKGROUND

Embodiments of the present disclosure generally relate to the field of software architecture and, more particularly, to managing how various entities are on-boarded, managed, and/or accessed in a multi-tenant system architecture.

Complex software systems can have various architectures, including a single-tenant software architecture and a multi-tenant software architecture, among others. In a single-tenant software architecture, each entity (such as a company or a portion of that company) can have their own instances of each software application, data, and any supporting infrastructure. In a single-tenant architecture, the software for each tenant entity can be customized as desired. However, drawbacks of using the single tenant architecture include expense in resources, as well as requirements to host, customize, and maintain separate software applications for each tenant.

In contrast, in a multi-tenant software architecture, each entity can share the same instances of applications, data, and/or infrastructure. A multi-tenant software provider can provision their applications and/or resources to multiple entities from a single software architecture. In multi-tenant software architecture, access to data can be shared among the various entities. By sharing much of the applications, data, and software, various resources such as installation, configuration, number of physical servers, maintenance, and even power can be optimized. However, drawbacks of using multi-tenant architecture include complexity of managing how multiple software applications are configured and shared among multiple clients. Also, design of multi-tenant architecture based software systems that provides secure and reliable access to the data can be problematic. Furthermore, interoperability difficulties may arise when using software applications, in a multi-tenant architecture system, that were initially managed and/or hosted by different businesses.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
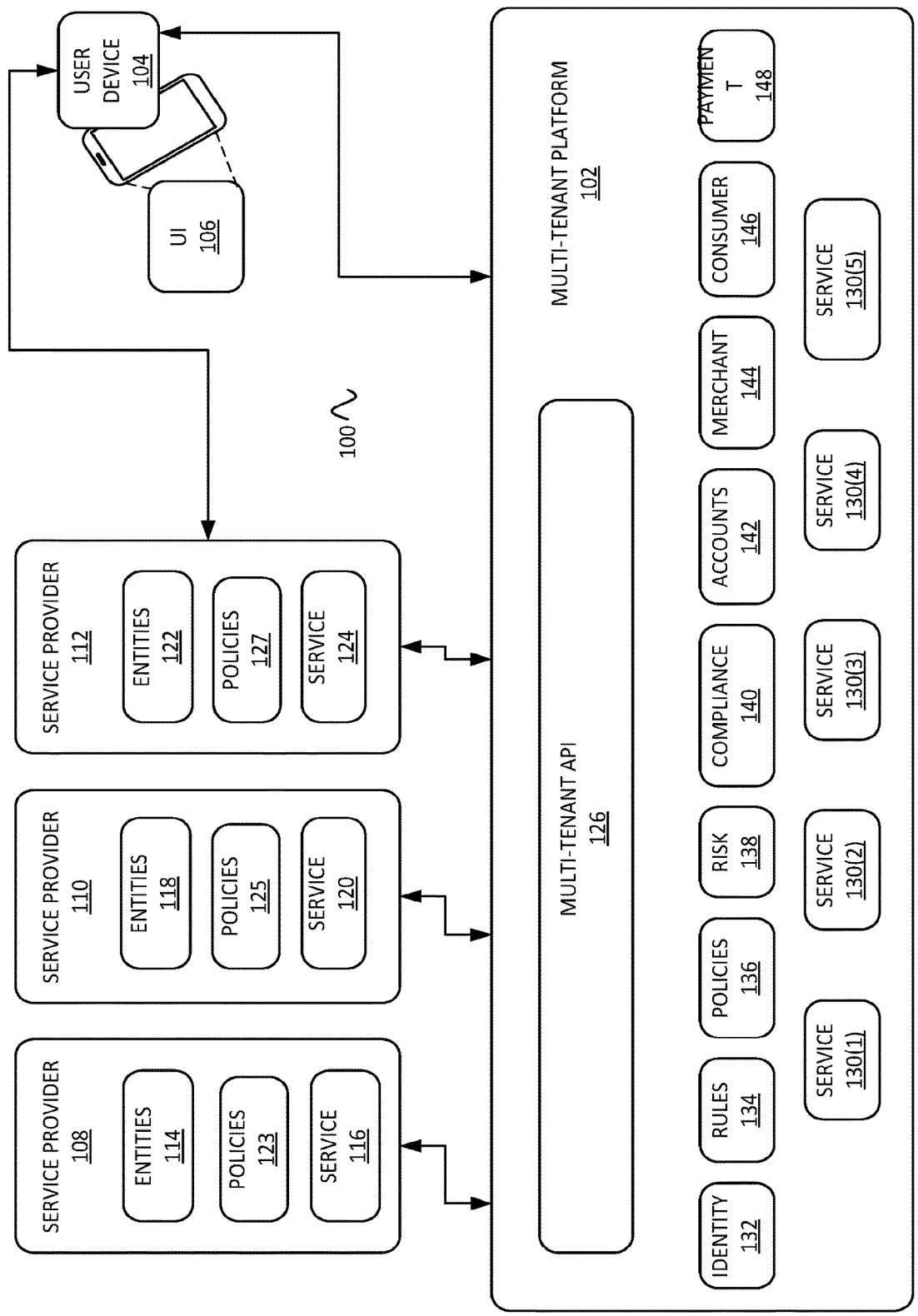
FIG. 1 is a system diagram illustrating embodiments of a multi-tenant software architecture system that can be accessed by communicating with a user device.

The description that follows includes exemplary systems, methods, techniques, instruction sequences, and/or computer program products that embody techniques of the present disclosure. However, it is understood that the described embodiments may be practiced without these specific details. For instance, although some examples refer to accessing tenant services, other types of service providers are contemplated, such as of Software-as-a-Service (SaaS), among others.

In a multi-tenant software architecture described herein, each tenant can share the applications, data, and/or infrastructure. A multi-tenant software provider can use a multi-tenant software platform to provision applications and/or resources to multiple entities. The multi-tenant software platform can facilitate addition of new tenants and on-board data and/or services provided by these new tenants. The multi-tenant software platform can use identity services to provide access to these services, such as from an entity associated one tenant to a service provided by another tenant. The multi-tenant software platform can also implement rules and policies for data access by various entities across the tenants.

The multi-tenant software platform (also referred to as a multi-tenant platform) can include multiple tenants that have been previously on-boarded. The multi-tenant platform can facilitate access, using a unified identity associated with a user, to the entities, policies, and services of these tenants. The tenants can be hosted and managed by service providers. Access to the services can be determined based on privileges of the unified identity, as well as on policies of each of the tenants. The services can include various merchant services, such as in-store check-out (at a certain tenant) via a user device (associated with the unified identity), access to an online store of the tenant, order-ahead at a certain store of the tenant, a cash-in process (e.g., at an Automated Teller Machine (ATM)) at a certain tenant, a cash-out process (e.g., at an ATM), self-checkout for fuel at pay-at-the-pump stations of the tenant, among others. The services can include SaaS and Platform as a Service (PaaS) services and/or other cloud services that are accessible by the user device. For example, the solution provider can provide access, to the user device, to various software applications, or deliver such software to the user device.

The multi-tenant platform can thus utilize unified identity services to provide access to selected services and/or data of the tenants based on policies associated with each of the tenants. The multi-tenant platform can use separate databases to store data to achieve isolation, such as when new tenants are on-boarded onto the existing platform, and providing logical and/or physical data isolation. Shared data access can be made possible by on-boarding the tenants and selectively cross-exposing services. For example, for a multi-tenant platform managed by PAYPAL, certain capabilities of the multi-tenant platform such as Risk-as-a-

Service (RaaS) can be provided to certain users of onboarded tenants such as XOOM. Similarly, certain capabilities of XOOM such as Fund Sending can be provided to certain users of PAYPAL. Thus, in some embodiments, the multi-tenant platform can include a core tenant (such as PAYPAL) that offers core services and infrastructure (including Identity-as-a-Service (IaaS) functionality) and any additional data access to selected tenants and/or users accessing the multi-tenant platform from that tenant. The level of access to the core services and/or infrastructure can be determined by rules and/or policies of each tenant and/or of the multi-tenant platform.

The multi-tenant platform can onboard new tenants as needed by using a one or more hierarchical data structures. In some embodiments, the multi-tenant platform can expose appropriate user experiences for a user application based on the user request. The multi-tenant platform can implement methods for providing IaaS services to various entities and/or tenants. The multi-tenant platform can provide the IaaS and other services based on the hierarchical data structures. As discussed below the multi-tenant platform can process user requests (e.g., from users of the core tenant or from users of an on-boarded tenant) and determine how to access a certain service.

In some embodiments, the multi-tenant platform can receive a request, at a first service provider, to provide a service for a user. The multi-tenant platform can accessing a representation of a second service provider in a first hierarchical data structure managed by the first service provider. In some embodiments, the multi-tenant platform is the first service provider that can provide certain services to entities that are referenced via identifiers determined using IaaS. The multi-tenant platform can determine that user data required for the service is managed by the second service provider that manages user identity of the user. The multi-tenant platform can determine that the representation is linked with a full identity reference for the second service provider in a second hierarchical data structure managed by the second service provider. The multi-tenant platform can access the user data at the second hierarchical data structure using the full identity reference. The multi-tenant platform can access the service via the lightweight identity reference and using the user data at the first service provider. The following description and associated Figures illustrate various embodiments directed to the ideas listed above.

FIG. 1 is a system diagram illustrating embodiments of a multi-tenant software architecture system that can be accessed by communicating with a user device. In an overview of the system diagram 100, a user device 104 can communicate with multi-tenant platform 102. The multi-tenant platform 102 can provide access to multiple service providers 108, 110, and 112. The multi-tenant platform 102 includes core services at elements 132-148, as well as additional services 130(1)-130(5). The multi-tenant platform 102 can provide services to the service providers 108-112, such as IaaS services that may be required for accessing other services. Thus, the multi-tenant platform 102 can manage a plurality of tenants, each one of which can be associated with one or more services, which are then exposed for access.

The multi-tenant platform 102 can store user information for users at the accounts 142. In some embodiments, the accounts 142 includes information for users (also referred to as "core users") of a core tenant. The core tenant can be one of the service providers 108-112, or a service provider that is fully integrated into the multi-tenant platform 102. The multi-tenant platform 102 can facilitate provision of various core services to the core users. The core services can include identity services 132, risk services 138, compliance services 140, and payment services 148. In one embodiment, the multi-tenant platform 102 provides IaaS services at the identity services 132 element. The identity services 132 can generate and maintain a core hierarchical data structure for managing its core entities. The core services can also include access to policy configuration 136, as well as access to accounts 142, merchants 144, and consumers 146. The accounts 142 are associated with the identity services 132.

The service provider 108 can include entities 114, policies 123, and services 116. Similarly, the service providers 110 and 112 include certain elements of entities 118 and 122, policies 125 and 127, and services 120 and 124, respectively. In some embodiments, a certain service provider can be fully integrated onto the multi-tenant platform 102, a process which can include generating the core hierarchical data structure for the core tenant. In this example, the identity services 132 can manage the core users, meaning that the service provider 108 does not have its own identity service for its own users. The service providers 108, 110, and 112 can be on-boarded onto the multi-tenant platform 102 and manage their own identities. Any access from the service provider 110 for access of a service other than its own services 120, such as access of a service 130(1), uses a unified identity for access of services and/or data across the multi-tenant platform 102.

The multi-tenant platform can onboard the service providers 108-112. As discussed below, the onboarding process can include accessing identity services to determine at least a portion of the entities that are being managed by the respective identity service. If the entities are not being migrated (e.g., by being fully integrated) to the identity services 132, then the identity services can generate representations of the entities being on-boarded in the core hierarchical data structure. These representations are then being used by the IaaS service to determine and use the unified identity (for a certain user) across the multi-tenant platform 102. The representations can include lightweight elements and/or linked elements. The identity services 132 can manage and access the policy configuration 136, such as to enforce access to certain customer and/or merchant domains. The policy configuration 136 can be accessed via the hierarchical data structures (discussed below) for each entity. The process of generating and using user representations is explained in more detail below.

The multi-tenant platform 102 can communicate, via the multi-tenant API 126, with the service providers 108-112 and/or the user device 104. The multi-tenant platform 102 can provide, based on a certain unified identity, information related to a tenant, associated services, and/or associated user experiences, to a requesting entity via the multi-tenant tenant API 126. Furthermore, the multi-tenant platform 102 can facilitate communication between various tenants, for example, the service providers 108-112, such as by providing IaaS services and use of unified identity.

For example, as discussed in more detail with reference to FIG. 5, a new tenant, such as the service provider 112, can be on-boarded by the multi-tenant platform 102. Information on the new tenant can be stored by one or more of the core services 132-148. In some embodiments, one or more of services of the new tenant, such as the service 124, can be exposed for access to other users of the multi-tenant platform 102. In one embodiment, the multi-tenant platform 102 can also generate a representation of the service 124 at the multi-tenant platform 102. Thus, any access from other tenants, such as from the user device 104 or from the service provider 110), to the service 124 is performed via a unified identity (e.g., by using IaaS) at the service representation.

The user device 104 can be any type of a computing device that can communicate user requests to the multi-tenant platform 102. The user device 104 can be implemented as a kiosk, a point-of-sale (PoS) terminal, a mobile device, among others. The user device 104 includes a user interface (UI) 106 through which the user can interact with displayed user experiences, such as to access certain services provided via the multi-tenant platform 102. The user device 104 can generate and communicate a user request for a certain service at the multi-tenant platform 102. The user device 104 can interface with the multi-tenant API 126, which can interface with various other components of the multi-tenant platform 102.

In some embodiments, one of the tenants, such as the core service provider 108, can implement one or more payment system functions. In these embodiments, the core service provider (that is integrated into the multi-tenant platform 102) can process a payment and order fulfilment for services provided via user experiences accessed at the UI 106. The core service provider can perform risk analysis (e.g., via the Risk core service 138) to determine whether or not to perform a certain service and/or process a payment for that service. In some embodiments, the core service provider can perform risk and/or verification services for the new tenant (e.g., the service provider 112) being on-boarded by the multi-tenant platform 102. The core service provider can process payments from the user account that is associated with the user device 104. The core service provider can provide financial services, such as a fund transfer (e.g., a transfer of a certain monetary amount), to the user. The core service provider can include payment accounts, each of which can be associated with a buyer or a seller. Once on-boarded as a core tenant, the accounts of the core service provider can be stored and accessed directly at the multi-tenant platform at the accounts 142 element. For example, a buyer (e.g., a user of the user device 104) can be associated with one payment account, and the seller (e.g., one of the tenants) can be associated with another payment account at the payment system. Upon successfully performing the risk analysis on the requested service (e.g., a requested transaction at the tenant), the core service provider can then perform (e.g., via the payment core service 148) a fund transfer from the buyer's payment account to the seller's payment account.

The payment system can be implemented by PAYPAL or another online payment system that allows users to send, accept, and request fund transfers. In some embodiments, the user experience can also provide access to certain services. Thus, in addition, or instead of, a payment service, the user experience can include other functionality that is unique for the certain tenant, such as selection of items for order, access to certain SaaS functionality, among others. Thus, the solution provider can provide funds in/funds out services, as determined based on the location data, from the payment system to the users of the user devices.

For simplicity, FIG. 1 only shows a single user device 104. However, as discussed herein, the multi-tenant platform 102 interfaces with multiple user devices, and thus provides access to services to many different users. Similarly, the multi-tenant platform 102 can onboard multiple tenants in addition to the ones shown. The multi-tenant platform 102 can also have multiple core tenants that are incorporated as part of the core services 132-148.

Figure 2:
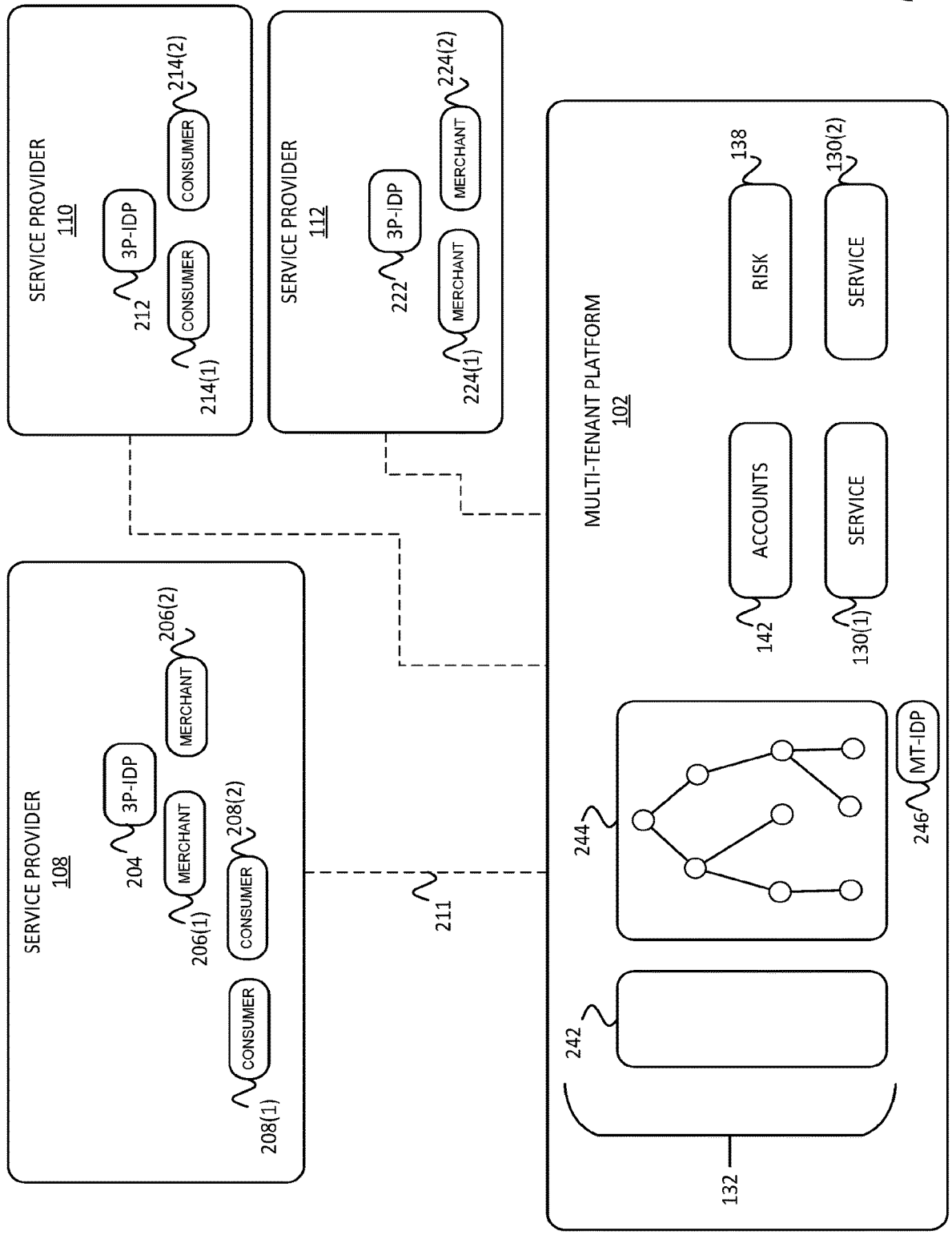
FIG. 2 is a system diagram illustrating embodiments of the multi-tenant software architecture of FIG. 1 including unified identity services.

FIG. 2 is a system diagram illustrating embodiments of the multi-tenant software architecture of FIG. 1 including unified identity services. FIG. 2 shows embodiments of how the identity services are implemented by each of the service providers 108-112, as well as by the multi-tenant platform 102. As shown, the service provider 108 can include a third party identity provider (3P-IDP) 204 that manages entities of merchant 206(1) and 206(2), and entities of consumer 208(1) and 208(2). Similarly, the service provider 110 can include a 3P-IDP 204 that manages entities of consumer 214(1) and 214(2). The service provider 112 can include a 3P-IDP 222 that manages entities of merchant 224(1) and 224(2). The multi-tenant platform 102 includes the identity service 132, the accounts 142 element, the risk 138 element, as well as services 130(1) and 130(2). In some embodiments, the 3P-IDPs 204, 212, and 222 are representations (in the hierarchical data structure 244) of the actual IDPs provided by the service providers 108, 110, and 112.

In the embodiments shown in FIG. 2, the service provider 108 can be on-boarded by the multi-tenant platform 102, but not fully integrated. Service providers can be fully integrated with the multi-tenant platform 102 by being made core to the multi-tenant platform 102. Thus, a link 211 is shown that indicates the on-boarded but not fully integrated status of the service provider 108. The identity service 132 includes an access tier 242 and the hierarchical data structure 244 that is managed by an MT-IDP 246. The multi-tenant platform 102 also includes services 138, 142, and 130(1)-130(2).

The access tier 242 is a part of the identity service 132 that customizes data associated with the service provider when being on-boarded with the multi-tenant platform 102. For example, the access tier 242 includes information about the products and/or services being offered by the service provider 108, as well as service endpoints for accessing services offered by the service provider 108. The service endpoints can be referenced by a corresponding node in the hierarchical data structure 244 for the service provider 108. Various embodiments of how the hierarchical data structure 244 is generated and accessed are discussed below with reference to FIGS. 3 and 4. The MT-IDP 246 can generate and manage representations of the entities 206(1), 206(2), 208(1), and 208(2) of the service provider 108 being on-boarded. Similarly, the MT-IDP 246 can generate and manage representations of entities for tenants of service providers 110 and 112.

As discussed, since each of the tenants, for example, the service providers 108-112, includes its own 3P-IDP 204, 212, and 222 respectively, each of these tenants continues to manage the identities of their own respective entities. For example, the service provider 110 continues to manage the entities 214(1)-214(2), including managing identity information, contact data, and any characteristics of the consumers 214(1) and 214(2). The service provider 110 can update any changes to the entities 214(1) and 214(2) to the multi-tenant platform 102. These 3P-IDP 212 originated updates are used to keep the data of their respective representations up-to-date. Similarly, any services (such as core services) performed via the representations of the hierarchical data structure 244 are also propagated back to the 3P-IDP 212.

Figure 3:
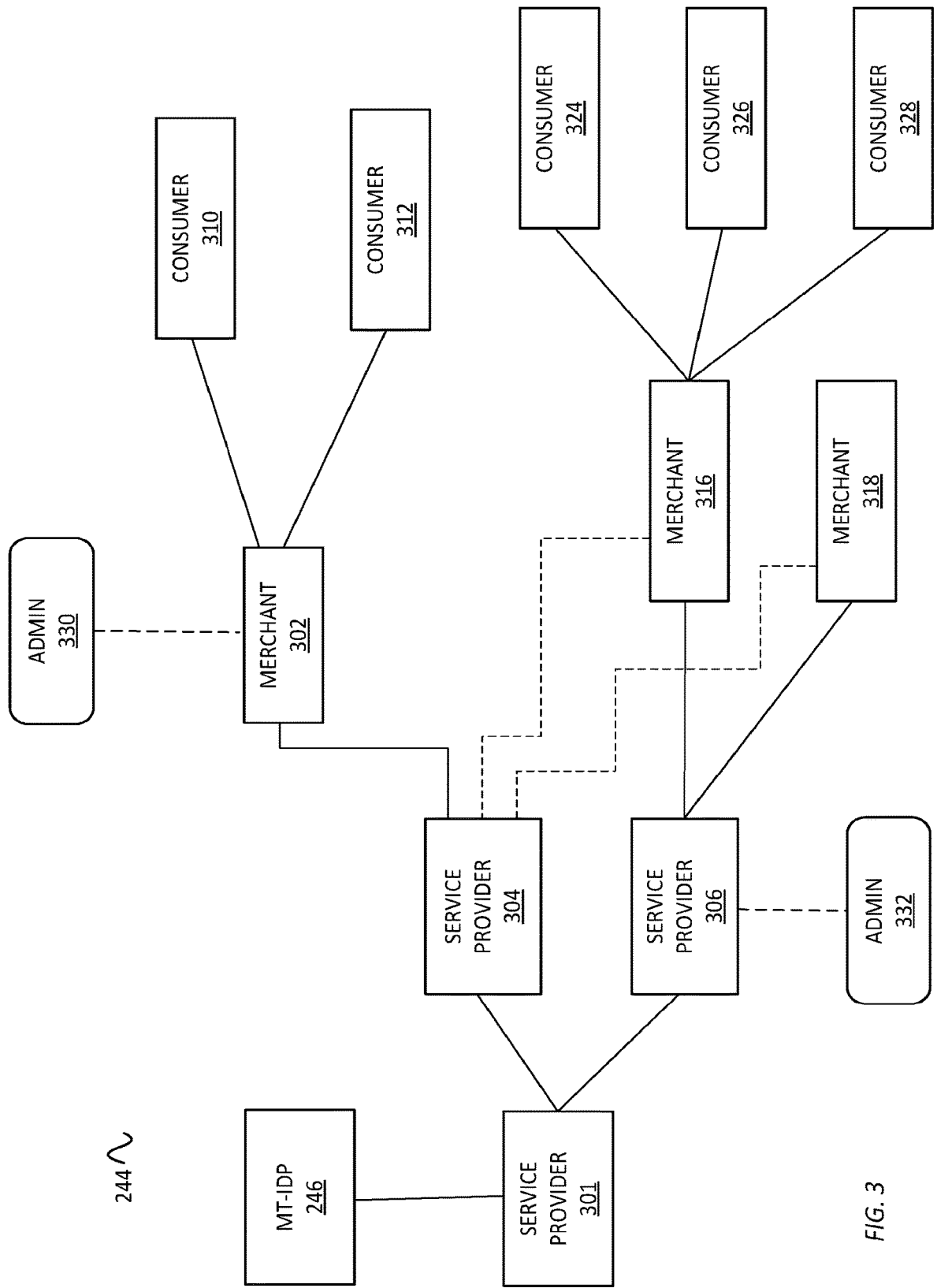
FIG. 3 is a diagram illustrating hierarchical data structures used by the multi-tenant software architecture systems that provide unified identity services.
Figure 4:
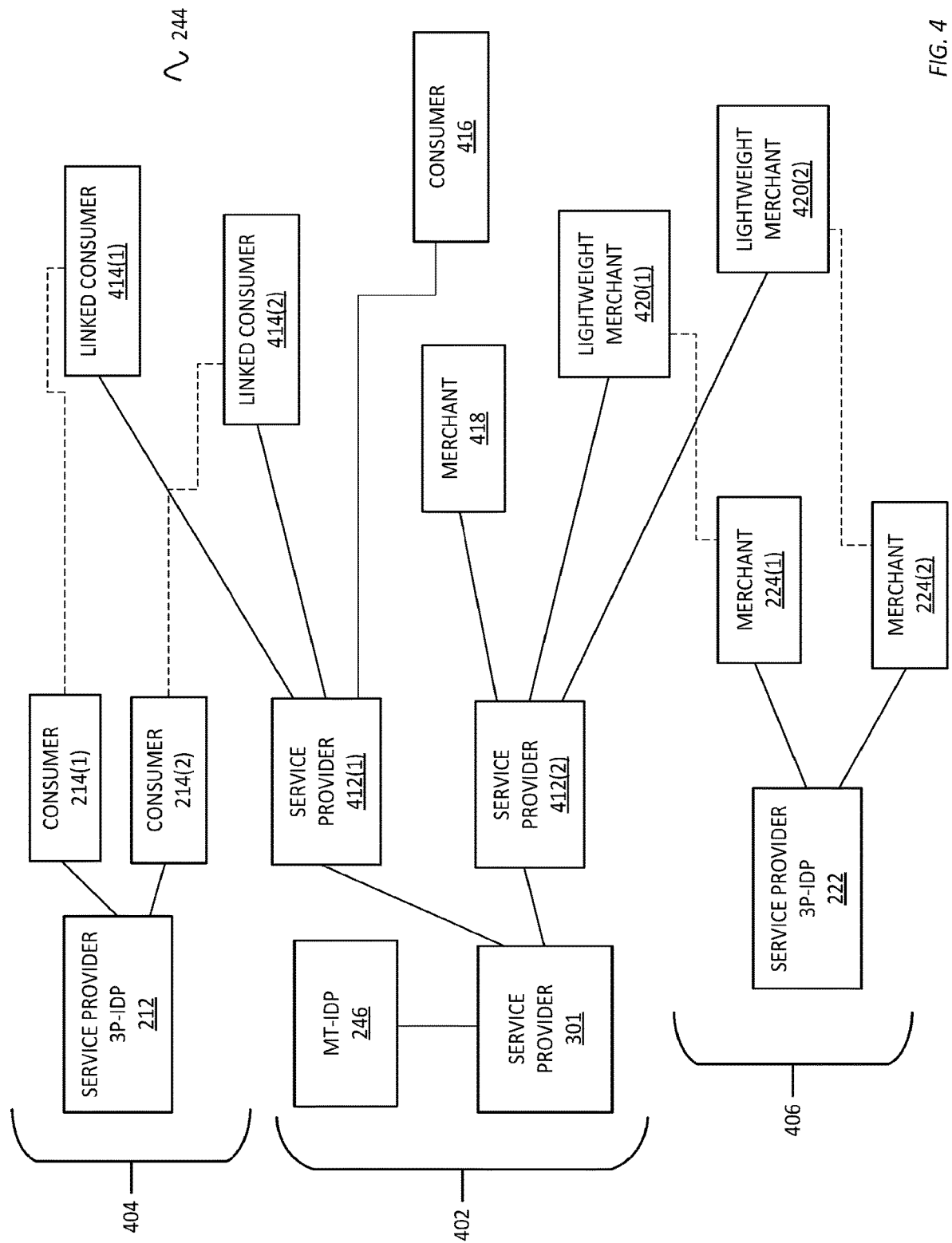
FIG. 4 is another diagram illustrating hierarchical data structures used by the multi-tenant software architecture systems that provide unified identity services.

FIG. 3 is a diagram illustrating hierarchical data structures used by the multi-tenant software architecture systems that provide unified identity services. FIG. 3 illustrates a hierarchical data structure that is managed by the MT-IDP 246. In FIG. 3, there are no additional IDPs, and the entities 301, 302, 304, 306, 310, 312, 216, 318, 324, 326, and 328 are fully integrated into the multi-tenant platform 102. In FIG. 3, a first layer of hierarchy includes the service provider 301, which can correspond to the fully integrated core service provider (e.g., PAYPAL). The organization and linking of the hierarchical data structures of FIG. 3 can be referred to as a dependency graph. Although not shown in FIG. 3 (or FIG. 4), each of the merchants can include, as child nodes, a plurality of users such as consumers. Other nodes in FIGS. 3 and/or 4 can similarly have additional children nodes, as desired. As seen in FIGS. 3 and 4, the hierarchical data structure 244 can be used by the multi-tenant platform 102 to model various organizations including small merchant, large merchant, bring-your-own merchant, bring-your-own-customer, marketplaces, among others.

The next layers of hierarchy include the service providers 304 and 306. The service providers 304 and 306 can be on-boarded but not fully integrated. The service providers 304 and 306 can inherit policies and configuration from the service provider 301. The hierarchical data structure shows that the merchants 316 and 318 are child nodes of the node of the service provider 306, and thus are acted upon by the service provider 306. The service provider 306 (as inherited from the service provider 301 and modified by access permissions associated with the service provider 306) defines the permissions of the merchants, including how the merchants 316 and 318 can communicate with other entities of the hierarchical data structure including consumers of the merchant 316.

The hierarchical data structure shows that the consumers 310 and 312 are child nodes of the node of the merchant 302, and thus are acted upon by the merchant 302. The merchant 302 (as inherited from the service provider 301 and modified by access permissions associated with the merchant 302) defines the permissions of the consumers, including how the consumers 310 and 312 can communicate with other entities of the hierarchical data structure 244. For example, the merchant 302 can define that the consumer 310 can view its own profile, access certain core services (such as services 130(1) and 130(2)). The service provider 306 can be associated with small business merchants, and thus merchants 316 and 318 can each represent a small business merchant.

The service provider 306 includes child nodes of merchants 316 and 318. The hierarchical data structure shows that the merchants 316 and 318 are linked to (but are not child nodes of) the service provider 304. Thus, the merchants 316 and 318 can be acted upon by the service provider 306, but can also be accessed (such as with read but not write privileges) by the service provider 304. An example of this is where the merchants 316 and 318 are two merchants that are operating as a part of the service provider 306 (which can implement a certain branch of PAYPAL). In this example, the service provider 304 can be a marketplace tenant such as EBAY that includes one entity (merchant 302), as well as links to two merchants 316 and 318. The service provider 306 (as inherited from the service provider 301 and modified by access permissions associated with the service provider 306) defines the permissions of the merchants, including how the merchants 316 and 318 can communicate with other entities of the hierarchical data structure including consumers of the merchant 316. It is noted that these links are used to link with nodes 316 and 318, instead of using representations (as discussed below) since the same MT-IDP 246 manages all of the nodes of 316, 318, and 306. FIG. 3 also illustrates admin entities 330 and 332 that have access to the merchant 302 and to the service provider 306, respectively. The administrator 330 and 332 can have various access permissions (such as ability to read configuration data).

FIG. 4 is another diagram illustrating hierarchical data structures used by the multi-tenant software architecture systems that provide unified identity services. FIG. 4 illustrates several hierarchical data structures 402-406. The first hierarchical data structure 402 is managed by the MT-IDP 246. The second hierarchical data structure 404 is managed by the 3P-IDP 212, and the third hierarchical data structure 406 is managed by the 3P-IDP 232. FIG. 4 illustrates the relationships between the entities of the hierarchical data structures 402-406. The organization and linking of the hierarchical data structures of FIG. 4 can be referred to as a dependency graph. It is noted that the organization and type of the hierarchical data structures 404 and/or 406 is shown for illustrative purposes only, and that one or more of the 3P-IDP 212 and 222 can implement different data structures, as desired. In this case, the Identity-as-a-Service (IaaS) services can further map different schema used by the 3P-IDP 212 and/or 222 to the hierarchical data structure 402. It is also noted that the hierarchical data structure managed by the MT-IDP 246 is also shown for illustrative purposes only, and other implementations are contemplated. In some embodiments, the 3P-IDPs 212 and 222 are representations (in the hierarchical data structure 244) of the actual IDPs provided by the service providers 110 and 112.

In FIG. 4, the entities 412(1), 412(2), 414(1). 414(2), 416, 420(1), and 420(2) are fully integrated into the multi-tenant platform 102, and are managed by the MT-IDP 246. The entities 214(1) and 214(2) are not fully integrated into the multi-tenant platform 102, and are instead on-boarded onto the multi-tenant platform 102. The entities 214(1) and 214(2) are managed by the 3P-IDP 212. Similarly, the entities 224(1) and 224(2) are on-boarded but not fully integrated into the multi-tenant platform 102. The entities 224(1) and 224(2) are managed by the 3P-IDP 232.

During the process of onboarding the service provider 110, the multi-tenant platform 102 can generate representations for the consumers 214(1) and 214(2) (that are managed by that tenant's 3P-IDP 212). The multi-tenant platform 102 can generate these representations by generating linked consumers 414(1) and 414(2). A linked consumer is an entity that represents a corresponding entity in another hierarchical data structure, and that contains a limited amount of the data for that corresponding entity. The linked consumers 414(1) and 414(2) link to the consumers 214(1) and 214(2), respectively.

Similarly, during the process of onboarding the service provider 112, the multi-tenant platform 102 can generate representations for the merchants 234(1) and 234(2) that are managed by that tenant's 3P-IDP 222. The multi-tenant platform 102 can generate these representations by generating lightweight merchants 420(1) and 420(2). A lightweight merchant is an entity that represents a corresponding entity in another hierarchical data structure, and that contains some of the data for that corresponding entity. The lightweight merchants 420(1) and 420(2) link to the merchants 234(1) and 234(2), respectively. The types of representations can include a linked entities and lightweight entities. In some embodiments, a linked entity (e.g., a linked consumer or a linked merchant) is different from a lightweight entity (e.g., a lightweight merchant or a lightweight consumer) by is that the lightweight entity includes an additional amount of information for its corresponding entity, and the type can be chosen during onboarding.

The hierarchical data structure 402 indicates that the linked consumers 414(1) and 414(2) are child nodes of the node of the service provider 412(1), and thus are acted upon by the service provider 412(1). However, the service provider 412(1) does not directly modify the linked to consumers 214(1) and 214(2). Similarly, the hierarchical data structure 402 indicates that the lightweight merchants 420(1) and 420(2) are child nodes of the node of the service provider 412(2), and thus are acted upon by the service provider 412(2). However, the service provider 412(2) does not directly modify the linked to merchants 224(1) and 224(2).

An example of this is where the merchants 324(1) and 324(2) are operating as merchants of a service provider 3P-IDP 222 (it is noted that for simplicity, both the 3P-IDP 222 and its service provider are shown as one box in FIG. 4, and similarly for the 3P-IDP 212), which can be a marketplace tenant. Although the lightweight merchants 420(1) and 420(2) inherit the access permissions from the service provider 412(2), the 3P-IDP 222 provides the access permissions to the merchants 224(1) and 224(2). In case of access permission conflict, the access permissions of the merchants 224(1) and 224(2) prevails.

Figure 5:
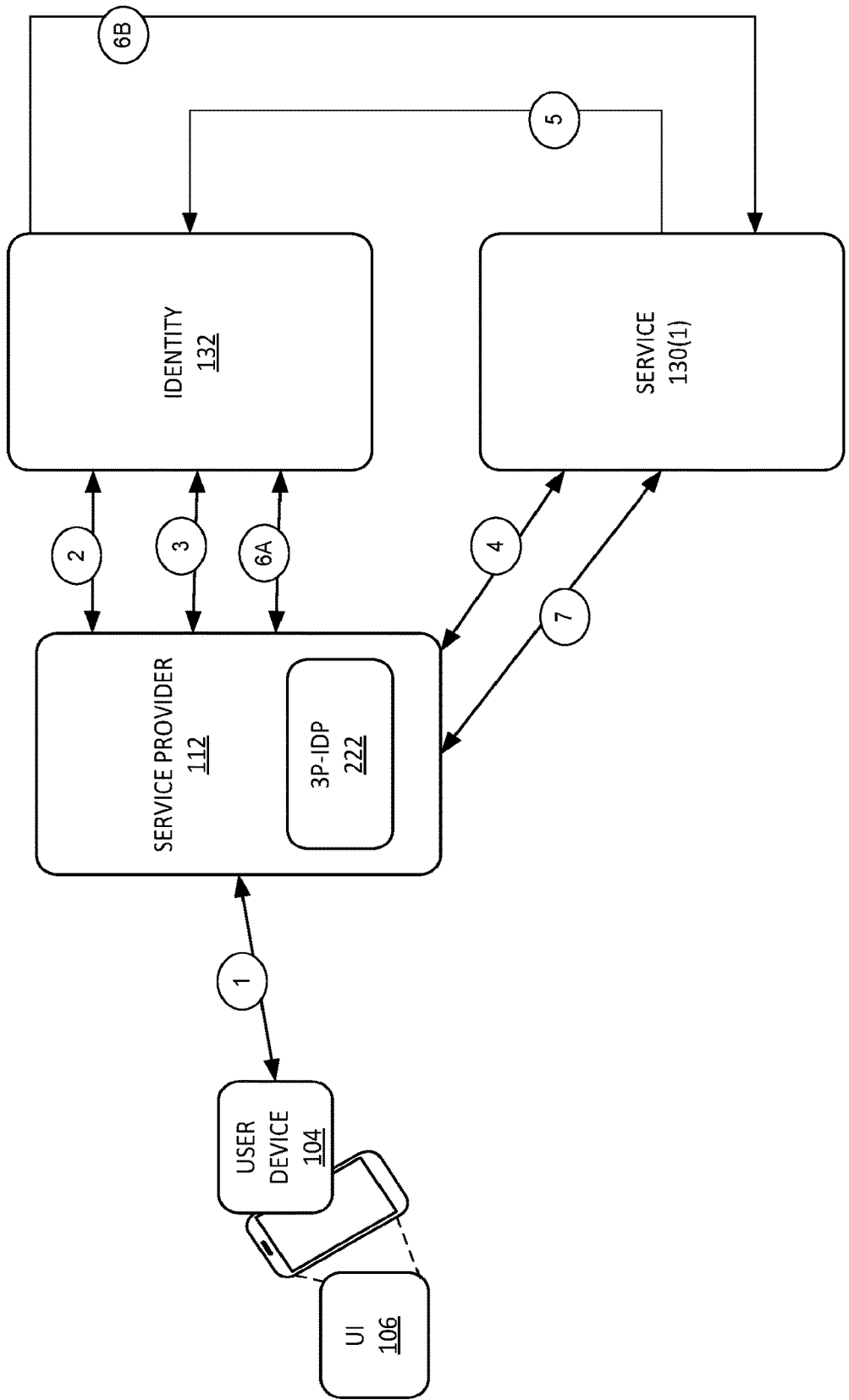
FIG. 5 is a flow diagram illustrating embodiments of operations for on-boarding and accessing tenants in the multi-tenant software architecture systems using unified identity services.

FIG. 5 is a diagram of an example flow 500 illustrating embodiments of operations for on-boarding and accessing tenants in the multi-tenant software architecture systems using unified identity services. The operations of FIG. 5 are exemplary and meant to illustrate how a user of the user device 104 can access services that are made available at the multi-tenant platform 102. The identity 132 element and the service 130(1) are a part of the multi-tenant platform 102, whereas the user is accessing a third party service provider 112.

At step 1, a user of the user device 104 can establish identity with the service provider 112. For example, the user can establish, by providing information via UI 106, identity with the 3P-IDP 222, which will then manage this identity with regard to any transactions being performed with any merchants (e.g., merchants 224(1) and/or 224(2)) also managed by the 3P-IDP 222. Interaction of the user with the service provider 112 can be performed without the service provider 112 being on-boarded with the multi-tenant platform 102. The 3P-IDP 222 can have its own hierarchical data structure (or an analogous structure for managing its entities) that indicates its merchants and/or other entities.

At step 2, the service provider 112 is on-boarded with the multi-tenant platform 102. The identity service 132 of the multi-tenant platform 102 can configure (such as at the access tier 242) services and capabilities (such as service 130(1)) that are available for access at the multi-tenant platform 102 by the service provider 112. The identity service 132 can also integrate the service provider 112 into its tenant hierarchy, such as by adding representations of the service provider, any consumers and/or merchants of the service provider 112, and users including the user.

Step 3 illustrates communication from the service provider 112 to the multi-tenant platform 102 that is initiated responsive to a user request. The user request can be a call, e.g., from the user, for a service that is only available at the multi-tenant platform 102. The call can be made to a merchant that is a part of the 3P-IDP 222, where the service 130(1) is exposed to the user as being provided by the service provider 112 (i.e., the user may be unaware of the relationships between the service provider 112 and the multi-tenant platform 102). Although FIG. 3 shows service 130(1) that is a core service at the multi-tenant platform 102, the service can be one that is offered by another on-boarded service provider. At step 3, the service provider 112 can communicate the call, to the identity service 132, that includes credentials of the user, the service provider 112, and/or the merchant to which the user call can be made. In some embodiments, the multi-tenant platform 102 can also return an access token (or another credential) to the service provider 112. The access token can indicate the representation of the user and/or the merchant in the hierarchical data structure of the multi-tenant platform 102.

At step 4, the service 130(1) can be accessed by the service provider 112 using the access token. At step 4, the multi-tenant platform 102 can determine that the service 130(1) requires additional user information to perform the service, as the representation in the hierarchical data structure does not include certain required information. At step 5, the service 130(1) can access the hierarchical data structure (at the identity service 132) to obtain the additional user information. At step 6A, the identity service 132 can communicate with the 3P-IDP 222 to obtain the additional user information. At step 6B, the identity service 132 returns the additional user information and any additional information from the hierarchical data structure to the service 130(1). At step 7, the service 130(1) completes the call and returns the result to the service provider 112. It is noted that as a result of the service being completed, the hierarchical data structure at the multi-tenant platform 102, as well as the separate hierarchical data structure managed by the 3P-IDP 222 can be updated.

Figure 6:
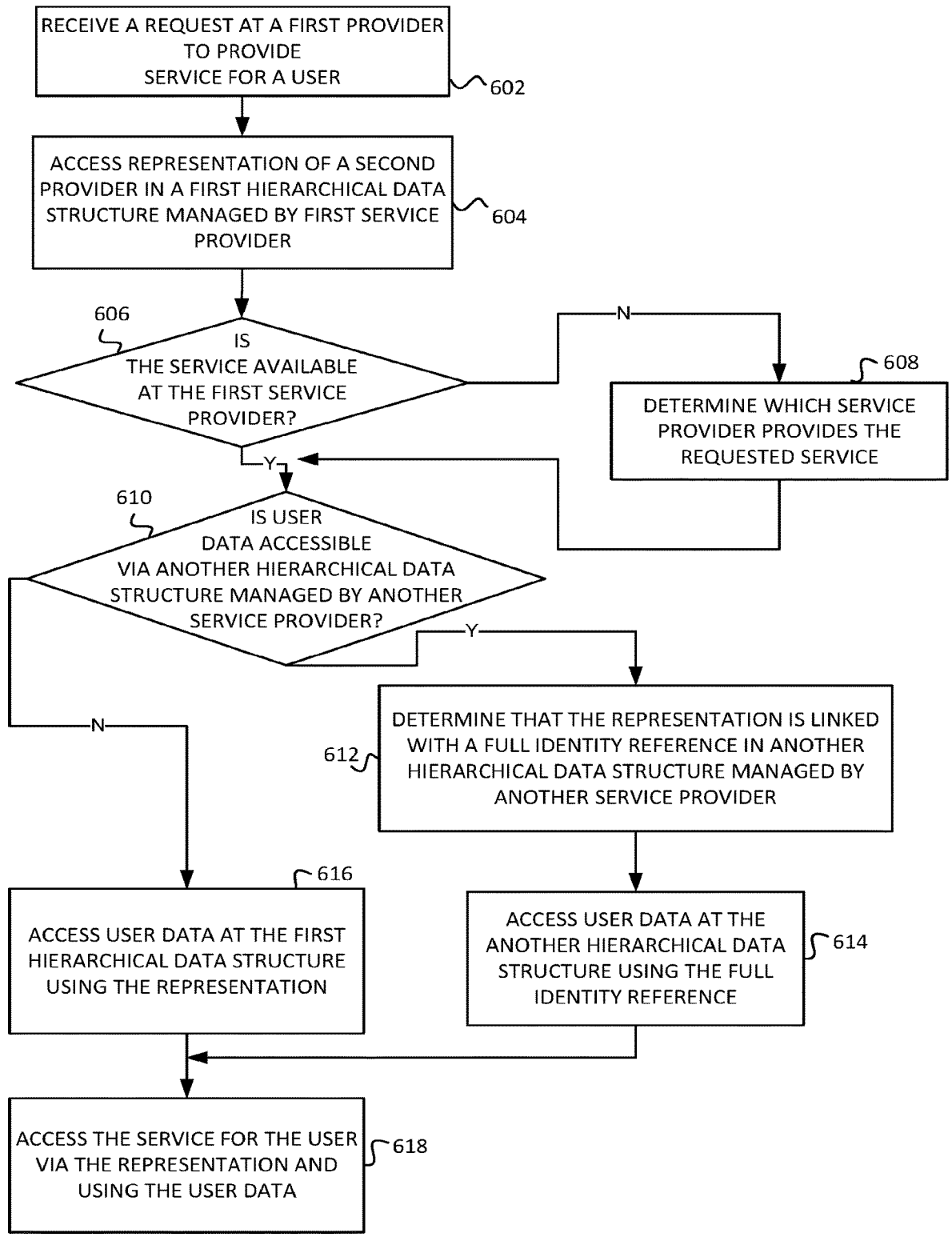
FIG. 6 is a flow diagram illustrating embodiments of operations for using multi-tenant software architecture systems that provide unified identity services.

FIG. 6 is a flow diagram illustrating embodiments of operations for using multi-tenant software architecture systems that provide unified identity services, i.e., IaaS. The method of FIG. 6 is described with reference to the systems and components described in FIGS. 1-5 (for illustration purposes and not as a limitation). The example operations can be carried out by the multi-tenant platform 102.

Beginning with 602, the multi-tenant platform 102 receives a request at a first provider to provide a service to a user. The multi-tenant platform 102 can receive a user request from a user device 104. The user request can be made via the UI 106 of the user device 104. For example, the user request can be made at the multi-tenant platform 102 (which can act as a service provider).

At 604, the multi-tenant platform 102 accesses a representation of a second service provider in a first hierarchical data structure that is managed by the first service provider. In some embodiments, the second system provider is configured to directly provide a second set of services to the user. The second set of services can be available for access from the first service provider using the first representation. For example, the representation (such as a lightweight merchant or a linked customer) can be accessed at the hierarchical data structure 244. In some embodiments, the hierarchical data structure 244 can be implemented as a dependency graph.

At 606, the multi-tenant platform 102 determines whether the service is available at the first service provider. If the service is available at the first service provider, flow continues to 610. Otherwise, flow continues to 608. At 608, the multi-tenant platform 102 determines which service provider provides the requested service. For example, the determination is for whether the requested service is one of the core services 130(1) available at the multi-tenant platform 102 (acting as the first service provider), or is a service that is provided by another service provider (also referred to as a "requested service provider").

At 610, the multi-tenant platform 102 determines whether the user data is accessible via another data structure that is managed by another service provider. If the user data is available at another service provider, flow continues to 612. Otherwise, flow continues to 616. For example, the multi-tenant platform 102 can determine that additional user information (for the user and/or the second service provider) that is needed to access the service is not available at the first hierarchical data structure. For example, the multi-tenant platform 102 can determine certain user data from the representation in the first data structure, but also determine that additional user information is needed to perform the service.

At 612, the multi-tenant platform 102 determines that the representation is linked with a full identity reference in another hierarchical data structure that is managed by another service provider. For example, with reference to FIG. 4, the representation of 414(1) can be linked to the full identity reference of 214(1) from the 3P-IDP 212 that is managed by the service provider 110.

At 614, the multi-tenant platform 102 accesses user data at the another data structure using the full identity reference. For example, the multi-tenant platform 102 can access additional user data via the full identity reference of 214(1) from the 3P-IDP 212. At 616, the multi-tenant platform 102 accesses user data at the first hierarchical data structure using the representation. For example, the multi-tenant platform 102 can access the user data via the linked consumer 414(1) from the MT-IDP 246, as no additional data is needed to access the service. At 618, the multi-tenant platform 102 accesses the service via the representation and using the user data (that may include the additional data if 614 is performed). The multi-tenant platform 102 can access the service at the requested service provider (as determined at 608).

It should be understood that FIGS. 1-6 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the flow diagrams of FIGS. 4 and 5 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 7:
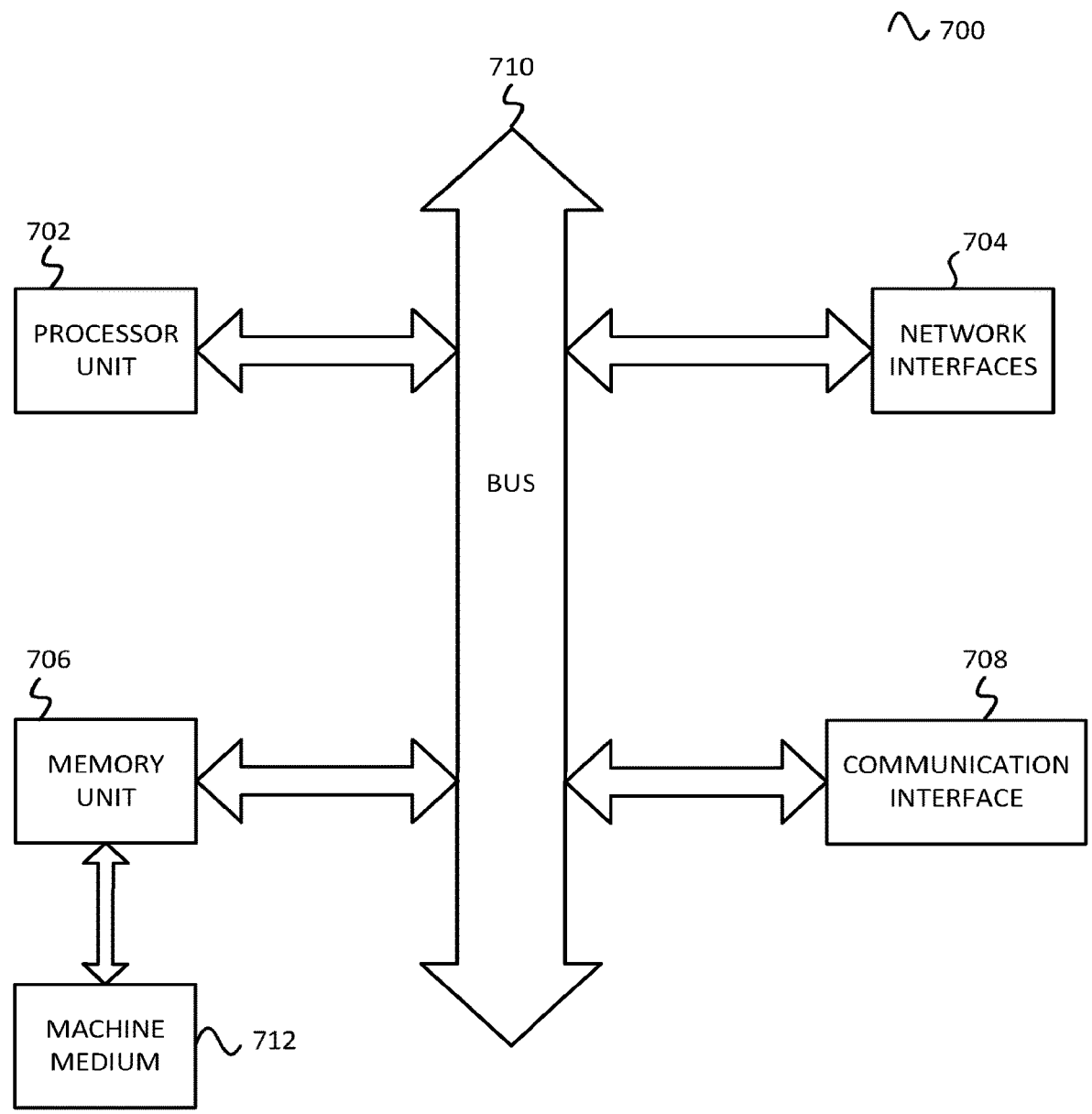
FIG. 7 is a block diagram illustrating embodiments of electronic devices used in the communication systems of FIGS. 1-6.

FIG. 7 is a block diagram of one embodiment of an electronic device 700 used in the communication systems of FIGS. 1-6. In some implementations, the electronic device 700 may be a laptop computer, a tablet computer, a mobile phone, a kiosk, a powerline communication device, a smart appliance (PDA), a server, and/or one or more other electronic systems. For example, a user device may be implemented using a mobile device, such as a mobile phone or a tablet computer. For example, a payment system may be implemented using one or more servers. The electronic device 700 can include a processor unit 702 (possibly including multiple processors, multiple cores, multiple nodes, and/or implementing multi-threading, etc.). The electronic device 700 can also include memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 700 can also include a bus 710 (e.g., PCI, ISA, PCI-Express, HyperTransport®, InfiniBand®, NuBus, AHB, AXI, etc.), and network interfaces 704 can include wire-based interfaces (e.g., an Ethernet interface, a powerline communication interface, etc.). The electronic device 700 includes a communication interface 708 for network communications. The communication interface 708 can include at least one of a wireless network interface (e.g., a WLAN interface, a Bluetooth interface, a WiMAX interface, a ZigBee interface, a Wireless USB interface, etc.), In some implementations, the electronic device 700 may support multiple network interfaces—each of which is configured to couple the electronic device 700 to a different communication network.

The memory unit 706 can embody functionality to implement embodiments described in FIGS. 1-6 above. In one embodiment, the memory unit 706 can include one or more of functionalities for using unified identity services in a multi-tenant architecture system. Any one of these functionalities may be partially (or entirely) implemented in hardware and/or on the processor unit 702. For example, some functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.). The processor unit 702, memory unit 706, the network interfaces 704, and the communication interface 708 are coupled to the bus 710. Although illustrated as being coupled to the bus 710, the memory unit 706 may be coupled to the processor unit 702.

While the embodiments are described with reference to various implementations and exploitations, it will be understood that these embodiments are illustrative and that the scope of the present disclosure is not limited to them. In general, techniques for using unified identity services in a multi-tenant architecture system as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method for using unified identity services in a multi-tenant architecture system, the method comprising:
   providing a multi-tenant platform, the multi-tenant platform managing, at least using a hierarchical data structure, representations of service providers and respective representations of their entities, the representations of service providers including a first provider representation of a first service provider, the first service provider configured to provide a first set of services including a first service to users;
   onboarding a new service provider onto the hierarchical data structure to create a new provider representation of the new service provider in the hierarchical data structure and to create a linked identity reference accessible by the first provider representation, wherein said onboarding the new service provider comprises creating a dependency graph indicating relationships and access permissions between entities of the hierarchical data structure and additional entities of new hierarchical data associated with the new service provider and wherein the dependency graph indicates the linked identity reference; and
   responsive to the onboarding of the new service provider, providing access, via the linked identity reference in the hierarchical data structure, to services of the new service provider to a merchant entity managed by the first service provider.

2. The method of claim 1, further comprising:
   receiving, at the first service provider, a request to provide the first service for a customer of merchant corresponding to the merchant entity; and
   determining, using the request, the linked identity reference in the hierarchical data structure based on relationship data for representations of the first service provider and the new service provider, wherein said providing access via the linked identity reference is performed responsive to the determination of the linked identity reference.

3. The method of claim 1, further comprising:
   accessing, using the linked identity reference, user data for a user via a second hierarchical data structure using a full identity reference corresponding to the new service provider, wherein said providing access via the linked identity reference is further based using the full identity reference.

4. The method of claim 1,
   wherein the new service provider is configured to directly provide a second set of services to a user; and
   wherein the second set of services are available for access from the first service provider using the first provider representation.

5. The method of claim 1,
   wherein the new provider representation is associated with access permissions at the multi-tenant platform; and wherein said providing access to services of the new service provider is performed based on the access permissions.

6. The method of claim 1, wherein said onboarding the new service provider comprises:
   determining a subset of entities of the new service provider that are migrated to the first service provider; and
   excluding the subset of entities from having representations created in a portion of the hierarchical data structure associated with the first service provider.

7. The method of claim 1, wherein said onboarding the new service provider comprises:
   determining a subset of entities of the new service provider that are not being fully integrated to the first service provider; and
   including the subset of entities in having representations created in a portion of the hierarchical data structure associated with the first service provider.

8. A system comprising:
   a non-transitory memory storing instructions; and
   a processor configured to execute the instructions to cause the system to:
      provide a multi-tenant platform, the multi-tenant platform managing, at least using a hierarchical data structure, representations of service providers and respective representations of their entities, the representation of service providers including a first provider representation of a first service provider, the first service provider configured to provide a first set of services including a first service to users;
      receive a new service provider with a subset of entities managed by the new service provider; and
      onboard the new service provider and the subset of entities onto the hierarchical data structure of the multi-tenant platform to create a new provider representation of the new service provider and at least one linked identity reference in the hierarchical data structure, the at least one linked identity reference accessible by the first provider representation for access to an entity of the subset of entities managed by the new service provider from a representation of first service provider,
      wherein the subset of entities are not fully integrated into the multi-tenant platform,
      wherein the at least one linked identity reference indicates relationships and access permissions between entities of the hierarchical data structure and additional entities of new hierarchical data.

9. The system of claim 8, wherein executing the instructions further causes the system to:
   responsive to the onboarding of the new service provider, provide access, via the linked identity reference in the hierarchical data structure, to services of the new service provider to a merchant entity managed by the first service provider.

10. The system of claim 8, wherein executing the instructions further causes the system to access, using the linked identity reference, user data for a user via a second hierarchical data structure using a full identity reference corresponding to the new service provider, wherein said providing access via the linked identity reference is further based using the full identity reference.

11. The system of claim 8,
   wherein the new provider representation is associated with access permissions at the multi-tenant platform; and
   wherein said providing access to services of the new service provider is performed based on the access permissions.

12. The system of claim 8, wherein said onboarding the new service provider comprises:
   determining another subset of entities of the new service provider that are migrated to the first service provider; and
   excluding the another subset of entities from having representations created in a portion of the hierarchical data structure associated with the first service provider.

13. The system of claim 8, wherein the hierarchical data structure is implemented as the dependency graph.

14. A non-transitory machine-readable medium having instructions stored thereon, the instructions executable to cause performance of operations comprising:
   providing a multi-tenant platform, the multi-tenant platform managing, at least using a hierarchical data structure, representations of service providers and respective representations of their entities, the representations of service providers including a first provider representation of a first service provider, the first service provider configured to provide a first set of services including a first service to users;
   onboarding a new service provider onto the hierarchical data structure to create a new provider representation of the new service provider in the hierarchical data structure and to create a linked identity reference accessible by the first provider representation, wherein said onboarding the new service provider comprises using a dependency graph indicating relationships and access permissions between entities of the hierarchical data structure and additional entities of new hierarchical data associated with the new service provider and wherein the dependency graph indicates the linked identity reference; and
   responsive to the onboarding of the new service provider, providing access, via the linked identity reference in the hierarchical data structure, to services of the new service provider to a merchant entity managed by the first service provider.

15. The non-transitory machine-readable medium of claim 14, wherein the operations further comprise:
   receiving, at the first service provider, a request to provide the first service for a customer of merchant corresponding to the merchant entity; and
   determining, using the request, the linked identity reference in the hierarchical data structure based on relationship data for representations of the first service provider and the new service provider, wherein said providing access via the linked identity reference is performed responsive to the determination of the linked identity reference.

16. The non-transitory machine-readable medium of claim 14, wherein the operations further comprise:
   accessing, using the linked identity reference, user data for a user via a second hierarchical data structure using a full identity reference corresponding to the new service provider, wherein said providing access via the linked identity reference is further based using the full identity reference.

17. The non-transitory machine-readable medium of claim 14, wherein said onboarding the new service provider comprises:
   determining a subset of entities of the new service provider that are migrated to the first service provider; and excluding the subset of entities from having representations created in a portion of the hierarchical data structure associated with the first service provider.

18. The non-transitory machine-readable medium of claim 14, wherein said onboarding the new service provider comprises:
   determining a subset of entities of the new service provider that are not being fully integrated to the first service provider; and
   including the subset of entities in having representations created in a portion of the hierarchical data structure associated with the first service provider.

19. The non-transitory machine-readable medium of claim 14,
   wherein the new service provider is configured to directly provide a second set of services to a user; and
   wherein the second set of services are available for access from the first service provider using the first provider representation.

20. The non-transitory machine-readable medium of claim 14,
   wherein the new provider representation is associated with access permissions at the multi-tenant platform; and
   wherein said providing access to services of the new service provider is performed based on the access permissions.

* * * * *